United States Patent [19]

Powlen

[11] Patent Number: 5,627,069
[45] Date of Patent: May 6, 1997

[54] TREATMENT OF ON-SITE ANIMAL WASTE PITS

[76] Inventor: Owen J. Powlen, R.R. 2, Box 145, Kewanna, Ind. 46939

[21] Appl. No.: 482,828

[22] Filed: Jun. 7, 1995

Related U.S. Application Data

[62] Division of Ser. No. 988,490, Dec. 10, 1992, abandoned.

[51] Int. Cl.$^6$ .................................................. C02F 3/34
[52] U.S. Cl. ........................... 435/267; 210/611; 252/180
[58] Field of Search ................................ 210/610, 611, 210/903; 435/267, 268, 853–857; 252/180, 181

[56] References Cited

U.S. PATENT DOCUMENTS

| | | |
|---|---|---|
| 3,962,035 | 6/1976 | Antos ................................. 210/611 |
| 3,973,043 | 8/1976 | Lynn ................................. 210/603 |
| 4,214,985 | 7/1980 | Bodenrader ....................... 210/611 |
| 4,264,448 | 4/1981 | Bodenrader ....................... 210/611 |

*Primary Examiner*—Thomas G. Wyse
*Attorney, Agent, or Firm*—Woodard, Emhardt, Naughton, Moriarty & McNett

[57] ABSTRACT

Provided are methods and compositions for treating on-site animal waste pits in order to soften the fluidized hardened solid wastes therein. The methods and compositions involve the use of Lactobacillus bacteria in effective amounts. Also preferably, a nitrogen-fixing bacteria is included in order to fix nitrogen in removed wastes to increase their fertilizer value.

8 Claims, No Drawings

5,627,069

TREATMENT OF ON-SITE ANIMAL WASTE PITS

This application is a division of application Ser. No. 07/988,490, filed Dec. 10, 1992, abandoned.

BACKGROUND

The present invention relates generally to the storage and handling of animal wastes generated on-site at facilities at which animals such as hogs or cattle are raised. More particularly, this invention relates to a method and composition for treating on-site animal waste pits or waste holding facilities in order to soften or fluidize hardened solid wastes, e.g. animal excretia, so that the waste materials can be more readily removed from the pits. Removal of collected, hardened solid wastes from such on-site pits has long been a problem. The method and composition of the present invention substantially fluidize hardened, encrusted solids in such waste pits, and thus facilitates their removal. Additionally, preferred methods and compositions of the invention provide for the fixation of nitrogen in the removed waste materials by a nitrogen-fixing bacteria, so that when used as fertilizer, the material removed from the pit is more valuable.

As further background to the invention, ruminant and other similar animals are raised in large numbers for human consumption or for other useful purposes. Needless to say, raising large numbers of such animals leads to the production of large amounts of solid and liquid waste materials. Typically, this waste material is collected and maintained for some period in animal waste holding pits situated beneath a facility in which the animals are housed. Also, sometimes, the wastes are stored and/or processed in lagoons, waste holding tanks or waste wetlands.

Periodically, solid and liquid waste materials must be removed from animal holding pits or the like as they become full. This is usually accomplished by pumping solids and liquids from the pits. The removed materials are then most often spread across crop fields for their fertilizer value. However, a problem encountered in removing the waste materials is that solids in the pits tend to settle to the bottom of the pits and harden. As a result, the breakup and removal of an encrusted layer of solid wastes is quite difficult. Nonetheless, if they are not removed, the solids collect too high in the pits, and dangerous conditions can result. For example, waste pits residing under animal holding facilities can become overly full, bringing the stored wastes into close contact with the animals and potentially exposing them to noxious materials including gases such as ammonia. Thus, difficult as it may be, it is extremely important to successfully remove solids from these waste holding pits.

In response to the problem of encrusted solid wastes in waste pits, there have been developed a number of compositions and methods which may be used to treat the encrusted solids in an attempt to soften them. For example, one method involves the use of complex machinery associated with waste pits which is designed to mix and break up the solids so that they may be pumped from the pit. However, such machinery is expensive, often difficult to maintain and marginally effective in some situations.

Another generally proposed method for treating waste pits to soften solids involves the addition of agents to the pit which are designed to chemically or biologically interact with the materials in the pit. For example, one product commercially available and today (known as "PIT BOSS") includes chelated copper sulfate. However, in practice this product has not been successful in significantly fluidizing or softening solids for their removal. Furthermore, this product includes materials which are harmful to animals and soil quality. Another product known to applicant, Farm Digestant, available from Dawn Chemical Corp. Milwaukee, Wis., is said to contain bacterial enzymes and bacteria which are supposed to interact with materials in waste pits to soften encrusted solids. However, this product is highly unsuccessful in breaking up encrusted solids, potentially because of the type or number of viable bacteria or bacterial enzymes in the product.

Thus, while some methods and compositions have been proposed in the past to treat encrusted solids in waste pits, these simply have not been successful. For example, they lead to no or minimal softening of solids, leaving removal of the solids still difficult. Additionally, other known methods are expensive, when one considers what little actual affect they have on ease of solids removal. Still further, other known methods require the use of expensive equipment, which also exposes farmers to risk and expense of equipment break down and repair costs.

In light of the above, there remains a need and demand for methods and compositions for treating animal waste pits so as to fluidize or soften solids that are hardened in the waste pits. Such a method and composition should have sufficient efficacy to make their use worthwhile from an economic standpoint. Additionally, such a method and composition should be environmentally safe. Furthermore, such a method and composition should not require the use of expensive mixing or other equipment, and should be readily employable by farmers using existing equipment on site. Preferably also, such a method and composition would be effective not only in quickly alleviating serious solids build-up problems, but also provide for safe, long term maintenance of waste pits and other similar holding facilities. The applicant's invention addresses these needs.

SUMMARY OF THE INVENTION

Accordingly, one preferred embodiment of the applicant's invention provides a method for treating an on-site animal waste pit to soften hardened solids within the waste pit. This inventive method comprises the step of inoculating an on-site animal waste pit having liquid and solid wastes collected therein, wherein said solid wastes have settled to the bottom of the pit and hardened, with a composition including an effective amount of viable Lactobacillus bacteria to substantially soften said hardened solid wastes.

Still another preferred embodiment of the present invention provides a composition for the on-site treatment of an animal waste pit to soften solid wastes collected and hardened therein. The composition comprises a dry, powdered carrier and, dispersed within the carrier, an effective amount of viable Lactobacillus bacteria to substantially soften said hardened solid washes.

In preferred aspects, the composition for treating the waste pit will include at least about one billion CFU's of Lactobacillus bacteria per gram, and will also include a nitrogen-fixing bacteria to fix nitrogen in the waste to increase its fertilizer value. The method of the invention will preferably involve periodically inoculating the on-site waste pit with at least about one million CFU's of viable Lactobacillus bacteria per gallon of wastes in the pit being treated. Additionally, preferred compositions are contained in hermetically sealed packages which contain sufficient composition for a single pit treatment.

One object of the present invention is to provide a method for treating an animal waste pit, which method substantially soften encrusted solid wastes so that they may be readily pumped from the pits and discarded or spread across crop fields for fertilizer value.

Another object of the invention is to provide a composition that leads to substantial softening of encrusted solid wastes in an animal waste pit so as to facilitate removal of the wastes.

Another object of the invention is to provide a method and a composition which can be used to treat animal waste pits both to soften encrusted solids and to fix nitrogen to increase the fertilizer value of wastes removed from the pits.

Another object of the present invention is to provide a method and composition for treating waste pits, which method and composition have an activity for softening encrusted waste pit solids far exceeding that of any product presently known to applicant.

Another object of the present invention is to provide a method and a composition for treating waste pits which is environmentally safe and economically sound.

Another object of the invention is to provide a method and composition which substantially reduce aerial ammonia above waste pits treated with the method or composition.

Still another object of the invention is to provide a method and composition which maintain favorable waste pit conditions with respect to solids build-up and solids consistency.

Additional objects, features and advantages of the invention will be apparent from the description herein.

DESCRIPTION OF THE PREFERRED EMBODIMENT

For the purposes of promoting an understanding of the principles of the invention, reference will now be made to certain preferred embodiments and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention pertains.

As mentioned above, preferred embodiments of this invention relate to a method and a composition for treating an on-site animal waste pit so as to substantially soften hardened or encrusted solid wastes within the pit. In this regard, this softening of solids is readily apparent after treatment of a waste pit in accordance with the invention. For example, prior to such treatment, a problematic waste pit will have a layer of encrusted solid wastes which is nearly impenetrable with a rod or similar instrument thrust down into the pit. In contrast, after treatment in accordance with the invention, a rod or similar instrument easily penetrates the once encrusted layer of solids. This softening of solids may also be observed by the ability to fluidize and pump substantially more solids from the waste pit after treatment by the invention as compared to prior to treatment by the invention, under the same pumping conditions. Further, a preferred characteristic of this softening can be observed by studying the solids pumped from the pit. Using the applicant's invention, the materials pumped from the pit appear as substantially fluidized solid particles in a liquid. That is, the solids have substantially no tendency to agglomerate or harden at the bottom of a vessel in which the removed materials are contained.

In preferred methods of the invention, an on-site animal waste pit having substantial hardened solids will be treated with an inoculum including the viable Lactobacillus bacteria, wherein the inoculum is sufficient to soften at least about 25% (by volume) of the solids build-up in the pit over about a six-month period. This inoculum can be and is preferably made by periodic inoculums of the bacteria, such as weekly, bi-monthly or monthly. More preferably, the inoculum over the six-month period will soften at least about 50 volume percent of the solids so that they may be pumped from the pit.

While the amount of Lactobacillus bacteria necessary to provide the desired softening of solids may vary somewhat, the applicant's experience has shown that it is preferred to periodically inoculate the on-site animal waste pit, with each inoculum having at least about one million CFU's (colony forming units) of viable Lactobacillus bacteria per gallon of wastes in the pit, and more preferably at least about 10 million CFU's per gallon of wastes in the pit. Higher amounts of these bacteria can be used, e.g. amounts ranging up to and exceeding one billion CFU's per gallon may be used; however, for economic reasons, the use of about 1–100 million CFU's/gallon is preferred. Further, it is preferred that such an inoculum be provided periodically, e.g. about weekly to about bi-monthly. It will be understood that more frequent inoculums of lower amounts of viable Lactobacillus bacteria to provide the same results is of course possible, and is contemplated as within the spirit and scope of the present invention.

After the hardened solids have been substantially removed from the on-site waste pit, sufficient inoculums of Lactobacillus bacteria are made to prevent further build-up of hardened solids.

As indicated above, the waste pit is preferably treated periodically with the bacteria. For these periodic treatments, it is preferred to have and use a composition which has at least about one billion colony forming units (CFU's) of dried, viable Lactobacillus bacteria per gram of composition, and typically in the range of about 1 to 20 billion CFU's of Lactobacillus bacteria per gram of composition more preferably about 1 to 10 billion CFU's/gram of composition. Even more preferably, the composition will have at least about 3 billion CFU's of Lactobacillus bacteria per gram for example in the range of about 3 billion to 5 billion CFU's/gram.

The Lactobacillus bacteria may include, for example, *Lactobacillus acidophilus, Lactobacillus bulgaricus, Lactobacillus thermophilus, Lactobacillus delbruecki, Lactobacillus casei, Lactobacillus coryniformis, Lactobacillus helveticus, Lactobacillus lactis, Lactobacillus leichmannii, Lactobacillus planetarium, Lactobacillus xylosus, Lactobacillus brevis, Lactobacillus buchneri, Lactobacillus coprophilus, Lactobacillus fermentum, Lactobacillus viridenscens,* and other Lactobacillus bacteria. Preferably, the composition of the invention includes *Lactobacillus acidophilus.*

The preferred composition of and for use in the present invention also includes a dry, powdered carrier. Preferably, the carrier includes a dry, powdered carbohydrate source such as whey, e.g. sweet whey (which contains a substantial percentage of lactose). Further, the composition can include one or more other sugars such as dextrose, and/or an aroma to hold down offensive smells emanating from the wastes, e.g. a strawberry, coconut or citrus aroma/flavoring agent such as is commercially available from Phar-More Biochemical of Milwaukee, Wis., U.S.A. The carrier can also include a drying agent, in powder form, such as Sipernet, a material that is commercially available from Phar-More Biochemical. Use of such a drying agent is particularly advantageous where the composition is initially formulated using bacterial compositions in liquid form. Furthermore, the carrier should be free from agents that would detrimentally interfere with the viability of the bacteria in the composition. Preferred compositions may also include a surfactant to aide in breaking up animal hair mats or the like.

The Lactobacillus bacteria used in the preferred composition of the present invention are included in a dry, inactivated but viable state. Thus, it is important that the composition be maintained in a dry state, at least until immediately prior to use, so as to avoid premature activation of the bacteria. Therefore, it is desirable that the composition of the invention be packaged in a hermetically sealed, moisture-proof container, such as a hermetically sealed plastic bag or bucket-type container, so as to prevent moisture penetration into the product and resultant premature activation of the Lactobacillus bacteria.

A particularly preferred composition of the invention and for use in treating animal waste pits comprises a carrier including whey and a sugar such as dextrose. The dextrose or other sugar is desirably present in an amount of about 0–50 parts by weight per 100 parts by weight of the carrier, more preferably about 1–20 parts per 100 parts of the carrier, and the whey (desirably sweet whey) in an amount of about 50–100 parts by weight per 100 parts of the carrier, more preferably at least about 80 parts by weight.

To prepare the composition of the invention, the Lactobacillus bacteria are admixed into the carrier. The Lactobacillus bacteria are generally mixed in a fashion which does not cause significant disruption of their viability, and in an amount sufficient to provide at least about one billion CFU's of viable Lactobacillus bacteria per gram of the overall composition, more preferably at least about three billion CFU's of viable Lactobacillus bacteria per gram of the composition. Further, the composition may include other common materials such as bacterial enzymes or other non-pathogenic bacteria in order to aid in the treatment process. Also, the composition preferably includes an amount of nitrogen-fixing bacteria, such as a bacillus bacteria, which is sufficient to fix nitrogen in the wastes so as to increase the amount of fixed nitrogen in the removed waste from the treated pit and to thereby increase its nitrogen value. The nitrogen-fixing bacillus can be a bacillus such as a *azotobacier vinelandii, bacillus megaterum, rhizobium, leguminosarm* or the like. *Trichoderma virde* can also be included to act as a raw fiber decomposing bacillus. Furthermore, other organisms such as *Candida utilis* acting as a yeast fungus and green algae chlorella can be included. As indicated above, as a result of the addition of such organisms, the removed solid material has an increased degree of nitrogen fixation, and thus its fertilizer value is increased. Other bacteria, for instance nonpathogenic Streptococcus bacteria, e.g. *Streptococcus faecium,* can also be included in the composition.

After treatment according to the invention, the pH of the removed waste materials usually ranges from about 6.8 to about 7.2. Such a final pH range is highly desirable, especially when the removed materials are used for their fertilizer value. As an added advantage, compositions and methods of the invention also significantly reduce aerial ammonia within facilities residing above treated waste pits.

The following Table provides a typical analysis of a suspended solids sample removed from a swine waste pit treated in accordance with the invention:

TABLE 1

| Values As Weight Percent Unless Noted | As Is | Dry Matter |
|---|---|---|
| Moisture | 94.60 | |
| Total Nitrogen | 0.64 | 11.91 |
| Ash | 1.01 | 18.77 |
| pH | 6.9 | |
| Calcium | 0.136 | 2.513 |
| Phosphorus | 0.122 | 2.261 |
| Magnesium | 0.044 | 0.822 |
| Potassium | 0.168 | 3.104 |
| Sodium | 0.042 | 0.777 |
| Sulfur | 0.015 | 0.272 |
| Maganese (ppm) | 5.1 | 94.7 |
| Copper (ppm) | 3.5 | 64.3 |
| Cobalt (ppm) | 0.05 | 0.86 |
| Zinc (ppm) | 13.4 | 248.4 |
| Iron (ppm) | 21.0 | 389.3 |
| Molybdenum (ppm) | 0.3 | 6.4 |
| Boron (ppm) | 2.4 | 44.5 |
| Phosphate as $P_2O_5$ | 0.28 | 5.15 |
| Potash as $K_2O$ | 0.20 | 3.72 |
| Organic Matter | 4.39 | 81.23 |

As can be seen, total nitrogen content of the solid matter removed is about 11.9 percent (based on dry matter). This was the result of a treatment without nitrogen-fixing organisms in the treatment composition. In similar runs using nitrogen-fixing organisms in the composition, the weight percent nitrogen in the dry matter ranged above about 15 percent, for example in one case 15.5 percent and in another about 18.8 percent nitrogen in the dry matter. Moreover, this nitrogen was fixed by the nitrogen-fixing bacteria, thus making the nitrogen more utilizable and increasing the fertilizer value of the removed wastes.

For the purposes of promoting a further understanding of the present invention and its preferred features, the following examples are provided. It will be understood, however, that these examples are illustrative and not limiting in nature.

EXAMPLE 1

A 60,000 gallon swine pit (8 feet deep by 10 feet wide by 106 feet long) situated beneath a swine facility contained a build-up of 7 feet of solids. Such a solids build-up is highly detrimental to the facility, as waste materials reside dangerously close to the flooring and thus to the animals. Prior to treatment, the solids were hardened, leaving a difficulty penetrable crust of solids. This swine pit was treated weekly with a composition comprising 80 grams of ALL-LAC 20 (Alltech, Inc., Nicholasville, Ky., U.S.A.) blended into about 400 grams of sweet dried dairy whey. ALL-LAC 20 contains a minimum of 20 billion CFU *Lactobacillus acidophilus* per gram. Its ingredients include dried *Lactobacillus acidophilus* fermentation product, dried *Streptococcus faecium* fermentation product, dextrose, dried skim milk, malto dextrins, calcium silicate, and beta glucan as an encapsulating agent. After 7 weekly treatments, solids were pumped from the swine pit in an amount sufficient to reduce the solids level from 7 feet to 5 feet, representing a 2 foot gain. This represents a dramatic gain in the solids level, unprecedented by prior products which are said to have some beneficial affects in facilitating solids removal from swine pits.

EXAMPLE 2

A 50,000 gallon (8 feet deep by 8 feet wide by 60 feet long) swine pit was encrusted with 5 feet of hardened solids.

The swine pit resided below a swine facility, as in Example 1. Prior to treatment by the present invention, the swine pit had been treated with a chelated copper sulfate-based product which was said to aid in removal of solids from waste pits. After extended treatment with this copper sulfate product, no substantial gain was made in the solids level of the pit. Thereafter, the pit was treated weekly with a composition of this invention comprising 60 grams of ALL-LAC 20 blended into about 400 grams of sweet whey. After 5 weeks of such treatment, one-half foot of solids gain was obtained. Further, after 8 more weeks of treatment, 20 inches of solids were removed from the pit. It appeared that the copper sulfate product inhibited the activity of the inventive process. Even so, dramatic effects were demonstrated with the present invention, where prior known materials for the same purpose had failed.

EXAMPLE 3

A 140,000 gallon swine pit residing beneath a swine facility had dimensions of 80 feet by 40 feet by 6 feet deep. This pit had an encrusted solids level of 4 and ½ feet prior to treatment by the invention. The pit was treated for 7 weeks, each week receiving an inoculation of 100 grams of ALL-LAC 20 blended into about 400 grams sweet whey. After this 7 week treatment, 2 feet of solids were gained, making the final solids level 2 and ½ feet. These solids as removed from the pit were a highly fluidized mass, readily pumpable.

EXAMPLE 4

A 290,000 gallon beef pit (100 feet long by 50 feet wide by 8 feet deep), residing beneath a beef facility, contained 6 feet of encrusted solids. This pit was treated with the method of the invention for 8 weeks. In particular, 150 grams of ALL-LAC 20 blended into about 400 grams of sweet whey were added to the pit each week. After 8 weeks, 3 feet of solids had been removed from the pit, making the final solids level 3 feet. More solids could have been removed; however, after removal of the 3 feet of solids, no more solids were needed for fertilization purposes. Moreover, this pit was equipped with a mechanical agitation system as is commonly used in the art to remove solids. Such systems are expensive both to purchase and to operate. Based upon previous experience, it was determined that 3 weeks of treatment in accordance with the invention had achieved what it would have taken the mechanical agitation system 3 solid days of operation to achieve. Such efficacy in solids removal without need of expensive agitation equipment is unprecedented, and reflects the dramatic character of the present invention.

EXAMPLE 5

A swine pit having the dimensions of 6 feet deep by 40 feet wide by 80 feet long was treated weekly with about 40 grams of Lactosec (commercially available from Heinhold Feeds, Kouts, Ind., U.S.A. and containing 20 billion CFU's/ gram of Lactobacillus). After only 2 weeks treatment, 1 and ½ feet of solids were pumped from the pit.

EXAMPLE 6

Composition of the Invention

Pit treatment compositions were prepared by dry mixing the following materials in the following amounts:

| Ingredient | Amount |
| --- | --- |
| Composition No. 1 | |
| Dextrose | 91 kg |
| Sipernet (drying agent) | 45.5 kg |
| Sweet Whey | 682 kg |
| Aroma (Strawberry, Coconut or Citrus) | 2.25 kg |
| Lactobac* (containing Lactobacillus acidophilus and other lactobacteria/20 billion CFU/gram) | 90 kg |
| Composition No. 2 | |
| Dextrose | 91 kg |
| Sweet Whey | 730 kg |
| Lactobac* (dry) | 90 kg |

*Commercially available from Phar-More Biochemical, containing 20 billion CFU's of *Lactobacillus acidophilus* per gram and also *Streptococcus faecium*.

In especially preferred embodiments, in addition to the above ingredients, the formulation also includes an effective amount of a nitrogen-fixing bacteria. The nitrogen-fixing bacteria as included in an amount effective to increase the amount of nitrogen that is present in the solids pumped out of the pit, preferably increased in amount by at least about 2 percent by weight based on dry matter. Further, preferred formulations may also include beneficial bacterial enzymes or other digestion aids.

What is claimed is:

1. A composition for the on-site treatment of an animal waste pit to soften solid wastes collected and hardened therein, comprising a dry, powdered carrier and, dispersed within the carrier, an effective amount of viable Lactobacillus bacteria to substantially fluidize said hardened solid wastes, and an effective amount of a nitrogen-fixing bacteria to increase the amount of fixed nitrogen in wastes removed from animal waste pits treated with the composition.

2. The composition of claim 1, wherein said composition includes at least about one billion CFU's of Lactobacillus bacteria per gram.

3. The composition of claim 2, wherein the composition includes at least about three billion CFU's of Lactobacillus bacteria per gram.

4. The composition of claim 1, which is contained in a sealed, moisture-proof container.

5. The composition of claim 1, wherein said carrier includes dried whey.

6. The composition of claim 5, wherein said dried whey is dried sweet dairy whey.

7. The composition of claim 6, wherein the carrier is at least about 90 percent comprised of said dried sweet dairy whey.

8. The composition of claim 7, which also includes dextrose.

* * * * *

UNITED STATES PATENT AND TRADEMARK OFFICE
CERTIFICATE OF CORRECTION

PATENT NO. : 5,627,069
DATED : May 6, 1997
INVENTOR(S) : Owen Jay Powlen

It is certified that error appears in the above-indentified patent and that said Letters Patent is hereby corrected as shown below:

In col. 4, line 46, please delete "delbruecki" and insert in lieu thereof --delbrueckii--.

In col. 5, lines 45-46, please delete "azotobacier" and insert in lieu thereof --azotobacter--.

Signed and Sealed this

Third Day of February, 1998

Attest:

BRUCE LEHMAN

*Attesting Officer*     Commissioner of Patents and Trademarks